Jan. 22, 1957  A. H. MEYER  2,778,049

SCOURING PAD HOLDER

Filed Oct. 8, 1953

INVENTOR
Alfonse H. Meyer

BY Johnson and Kline
ATTORNEYS

2,778,049

SCOURING PAD HOLDER

Alfonse H. Meyer, Naugatuck, Conn., assignor of one-third to Milton N. Forde, Naugatuck, and one-third to Clarence I. McCall, Waterbury, Conn.

Application October 8, 1953, Serial No. 384,859

8 Claims. (Cl. 15—209)

This invention relates to holders for scouring pads made of woven mesh, steel wool and the like.

An object of the invention is to provide a sturdy and practical, easily-operated scouring pad holder which has improved means for effectively securing the pad in operative position, and which is so arranged and organized that a user is enabled to readily reach corners and other inaccessible places of kitchen ware with the pad, to accomplish an effective and thorough cleaning.

Another object of the invention is to provide an improved scouring pad holder in accordance with the above, which is small, compact and attractive in appearance, devoid of small exposed crevices or other configurations wherein dirt might collect, and which is extremely simple in construction and economical to fabricate.

A feature of the invention resides in the provision of simplified and reliable means engageable with the pad to retain the latter in place on the holder, which retaining means is so recessed and arranged that it will not become exposed or interfere with operation of the pad as the latter wears down.

Another feature of the invention resides in the provision of novel pad-retaining means in the form of prongs or tines which are formed or bent into a shape enabling a simplified detent and locking action to be obtained, the tines being yieldably held in pad-impaling positions and being normally locked to and held against separation from the holder when in pad-releasing positions.

Other features and advantages will hereinafter appear.

In the accompanying drawings, showing one embodiment of the invention as illustrative thereof:

Figure 1:
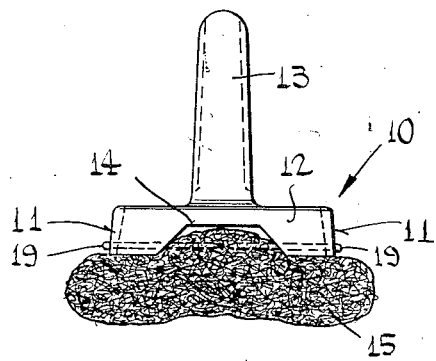
Figure 1 is an end elevational view of the improved scouring pad holder of the invention, having a scouring pad attached thereto.

As shown, the improved scouring pad holder of this invention comprises a generally flat base 10 having a somewhat rectangular outline, with one pair of opposite sides 11 being straight and parallel and the other pair of opposite sides 12 curved or convex.

The base 10 has a generally flat, substantially rectangular upstanding handle 13 extending centrally across it between the curved sides 12. In the underside of the base 10 there is provided a wide, shallow groove 14 extending between the curved sides 12 and located below the handle 13 and preferably in alignment therewith.

Figure 2:
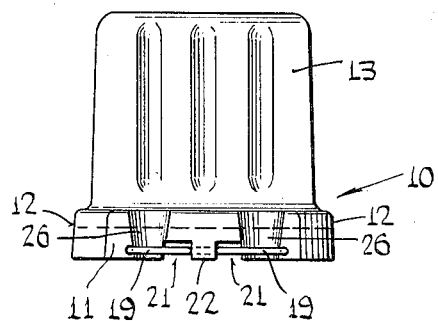
Fig. 2 is a side elevational view of the improved scouring pad holder.
Figure 4:
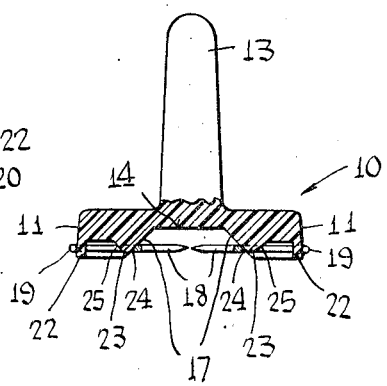
Fig. 4 is a view of the scouring pad holder partly in vertical section and partly in end elevation, showing details of construction.
Figure 5:
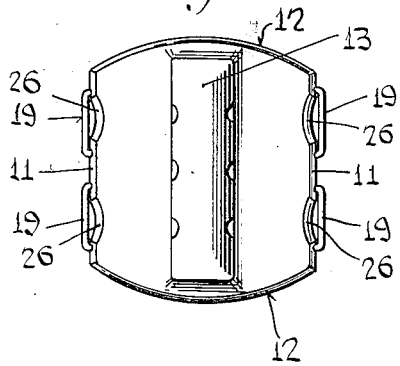
Fig. 5 is a top or plan view of the scouring pad holder, with the pad impaling tines in operative or pad-retaining positions.

For the purpose of accommodating means for securing a scouring pad 15 to the underside of the base 10, the base is provided with pairs of horizontally-extending bores 16 communicating with the straight sides 11 and with the sloping walls 17 of the groove 14. The bores 16 preferably extend along parallel lines and are arranged to receive pairs of prongs or tines 18, the prongs of each pair being connected together by a connector or yoke portion 19. At the centers of the yoke portions 19 are U-shaped offsets 20 adapted for disposition in recesses 21, Fig. 2, in the underside of the base when the tines are in their pad-retaining positions such as shown in Fig. 4.

Figure 3:
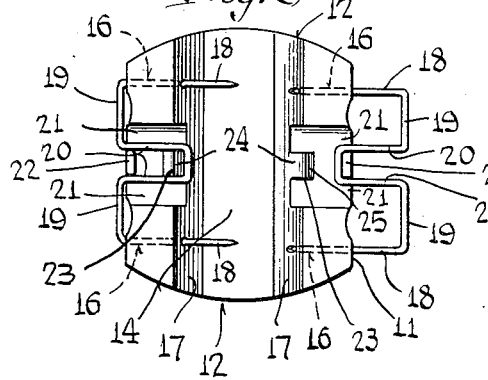
Fig. 3 is a bottom view of the scouring pad holder showing some of the pad-impaling tines in operative or pad-retaining positions, and showing the remaining tines in pad-releasing position.

For the purpose of preventing inadvertent removal and separation of the tines 18 from the base 10, the latter is provided with depending lugs 22 adapted to engage the offset portions 20 as shown in the right portion of Fig. 3. The base 10 also has rounded depending projections or nibs 23 functioning as detents in cooperation with the offsets 20 to yieldably hold the tines 18 in their pad-retaining positions as shown in the left portion of Fig. 3. The nibs 23 have sloping walls 24 and 25, enabling the offsets 20 to be readily forced over the nibs in either of the two directions of movement of the tines 18. The lugs 22, on the other hand, have straight perpendicular walls to prevent movement of the offsets 20 past the lugs, and such movement is only possible by distorting the connector or yoke portions 19 to shift the off-sets 20 downward out of engagement with the lugs 22.

It will be understood that this downward shifting of the offsets 20 is employed only during the operation of assembling the tines 18 to the base 10.

To facilitate actuation of the tines 18 from their pad-retaining to pad-releasing positions, the straight edges 11 of the base 10 are provided with shallow fingernail recesses 26 by which the yoke portions 19 of the retaining means may be readily engaged for shifting the tines to the pad-releasing position shown in the right portion of Fig. 3.

Referring to Figs. 1 and 3 it will be seen that the tines 18 on one side of the groove 14 are not aligned with those on the other side, but are slightly offset therefrom to prevent interference when the tines occupy the groove. The tines are disposed in the groove 14 of the base 10 when retaining the pad 15 in operative position, and since they do not project below the base the pad may be used until it is worn quite thin without the prongs 18 being exposed or interfering with the cleaning procedure. This is an important feature of the invention.

It will be understood that release of the pad 15 is effected by merely pulling on the yoke portions 19 to shift the tines 18 out of the groove 14, into pad-releasing positions. In Fig. 3 the right set of tines is shown in this position.

In securing a new pad in place, the pad is held against the bottom of the base and the yoke portions 19 forced inward against the straight walls 11, thus moving the lines 18 into the groove 14 wherein they impale the pad 15.

A scouring pad holder made in accordance with the above is simple in construction and economical to fabricate. The prong members may be readily formed from wire stock, the sets of prongs being identical with each other to avoid extra tool cost. The remainder of the holder, comprising the base 10 and the handle 13, may be readily molded in simple dies wherein the cavities are devoid of undercut walls, and the bores 16 made in a subsequent operation.

Variations and modifications may be made within the scope of the claims and portions of the improvements may be used without others.

I claim:

1. A holder for a scouring pad, comprising a generally flat base having a groove in its underside adapted to receive a portion of the scouring pad and having pairs of parallel bores extending substantially parallel to its upper and lower surfaces and communicating with said groove; pairs of tines connected by yoke members, said tines being adapted to pierce said portion of the pad and being carried respectively in said pairs of bores for longitudinal straight-line movement on the base between pad-retaining positions wherein they extend into the groove of the base and pad-releasing positions wherein they are retracted from the groove; manually-engageable means including said yoke members, for actuating the tines between said positions; cooperable retaining means including portions of said base and said yoke members, preventing complete removal of the tines from the base; and a handle attached to and upstanding from the base, adapted to be grasped by the hands of a user to manipulate the holder and scouring pad secured thereto.

2. The invention as defined in claim 1 in which the cooperable means comprises lugs on the base, constituting the said base portions, said lugs being normally disengaged from the yoke members.

3. The invention as defined in claim 1 in which there are cooperable detent means on the yoke members and on the base, yieldably holding the tines in their pad-retaining positions.

4. The invention as defined in claim 1 in which the cooperable retaining means comprises lugs on the base, constituting the said base portions, said lugs being normally disengaged from the yoke members, and in which there are detent members on the base and engageable with the said yoke members, yieldably holding the tines in their pad-retaining positions.

5. The invention as defined in claim 2 in which the yoke members have U-shaped portions underlying the base, and in which the lugs project from the underside of the base and are engageable with said U-shaped portions.

6. The invention as defined in claim 3 in which the cooperable retaining means comprises U-shaped portions of the yoke members underlying the base, and comprises projecting nibs on the underside of the base, constituting said base portions and engageable with said U-shaped portions, said U-shaped portions being resilient and displaceable laterally to disengage the lugs and release the tines.

7. The invention as defined in claim 4 in which the cooperable retaining means and cooperable detent means comprises U-shaped portions of the yoke members underlying the base, and comprises projections on the underside of the base engageable with said U-shaped portions.

8. The invention as defined in claim 1 in which the yoke members extend along edges of the base, and in which there are notches in said edges to enable the yoke members to be readily engaged by the fingers of a user, for actuating the tines.

References Cited in the file of this patent

UNITED STATES PATENTS

| | | |
|---|---|---|
| 1,821,505 | Field | Sept. 1, 1931 |
| 2,012,500 | Ebert | Aug. 27, 1935 |
| 2,067,535 | Kleinman | Jan. 12, 1937 |

FOREIGN PATENTS

| | | |
|---|---|---|
| 670,629 | France | Mar. 1, 1929 |